(12) United States Patent
Park

(10) Patent No.: US 11,462,018 B2
(45) Date of Patent: Oct. 4, 2022

(54) REPRESENTATIVE IMAGE GENERATION

(71) Applicant: NAVER WEBTOON Ltd., Seongnam-si (KR)

(72) Inventor: Jieun Park, Seongnam-si (KR)

(73) Assignee: NAVER WEBTOON LTD., Seongnam-si (KR)

( * ) Notice: Subject to any disclaimer, the term of this patent is extended or adjusted under 35 U.S.C. 154(b) by 0 days.

(21) Appl. No.: 16/831,019

(22) Filed: Mar. 26, 2020

(65) Prior Publication Data

US 2020/0226387 A1 Jul. 16, 2020

Related U.S. Application Data

(63) Continuation of application No. PCT/KR2018/008402, filed on Jul. 25, 2018.

(30) Foreign Application Priority Data

Sep. 26, 2017 (KR) ..................... 10-2017-0124444

(51) Int. Cl.
*G06V 20/40* (2022.01)
*G06V 30/413* (2022.01)
*G06V 40/16* (2022.01)

(52) U.S. Cl.
CPC ............ *G06V 20/47* (2022.01); *G06V 30/413* (2022.01); *G06V 40/172* (2022.01)

(58) Field of Classification Search
CPC ........... G06K 9/00751; G06K 9/00288; G06K 9/00456; G06K 9/6255; G06F 16/00; G06Q 50/10
USPC ........................................................ 382/103
See application file for complete search history.

(56) References Cited

U.S. PATENT DOCUMENTS

| 2013/0104016 A1* | 4/2013 | Nonaka ................... G06F 17/00 715/204 |
| 2018/0260661 A1* | 9/2018 | Konishi ................. G06K 9/527 |
| 2018/0336415 A1* | 11/2018 | Anorga ............... G06N 3/0454 |

FOREIGN PATENT DOCUMENTS

| JP | 2007193590 A | 8/2007 |
| JP | 2011100240 A | 5/2011 |
| JP | 2012063854 A | 3/2012 |
| JP | 2012530287 A | 11/2012 |
| JP | 2013089199 A | 5/2013 |
| JP | 2014038601 A | 2/2014 |
| JP | 2014049883 A | 3/2014 |
| JP | 2014064055 A | 4/2014 |
| KR | 1020140040875 | 4/2014 |
| KR | 20150116677 A | * 10/2015 |

(Continued)

OTHER PUBLICATIONS

ISR issued in Intl. application No. PCT/KR2018/008402, mailed Oct. 29, 2018.

(Continued)

*Primary Examiner* — Amandeep Saini
(74) *Attorney, Agent, or Firm* — Greer Burns & Crain Ltd.

(57) ABSTRACT

Representative image generation technology is provided. A representative image generation method according to embodiments of the present invention includes automatically generating a representative image for a relevant content by recognizing an object in the content, such as a webtoon, an illustration, multiple images related to a particular product, or a user's photograph album.

16 Claims, 9 Drawing Sheets

(56) References Cited

FOREIGN PATENT DOCUMENTS

| KR | 1020150116677 A | 10/2015 |
|---|---|---|
| WO | 2016043320 A1 | 3/2016 |

OTHER PUBLICATIONS

Office Action issued in corresponding Japanese patent application No. 2020-538507, dated May 25, 2021.

\* cited by examiner

REPRESENTATIVE IMAGE GENERATION

CROSS-REFERENCE TO RELATED APPLICATIONS

This is a continuation of International Application No. PCT/KR2018/008402, filed Jul. 25, 2018, which claims benefit of Korean Patent Application No. 10-2017-0124444, filed Sep. 26, 2017.

BACKGROUND OF THE INVENTION

Field of Invention

One or more example embodiments of the following description relate to representative image generation technology, and more particularly, to a representative image generation method that may recognize an object in content, such as a webtoon, an illustration, a plurality of images related to a specific product, a photo album of a user, and the like, and may automatically generate a representative image for the corresponding content. The present invention also relates to a computer apparatus for performing the representative image generation method, a computer program stored in a non-transitory computer-readable record medium to perform the representative image generation method on a computer in conjunction with the computer, and a non-transitory computer-readable record medium for storing a computer program for enabling a computer to perform the representative image generation.

Description of Related Art

The term "webtoon" is a combination of web indicating the Internet and cartoon meaning comics. Such webtoons are being serviced in various forms, such as comics in a vertical image file format displayed on a website, and comics in which a scene of a cut unit is displayed on a screen.

Also, various technologies are present to service such webtoons to users. For example, a cartoon providing system, a cartoon providing apparatus, and a cartoon providing method are described in Korean Patent Laid-Open Publication No. 10-2014-0040875. Disclosed is technology for providing a plurality of cut images constituting a cartoon.

Here, many technologies for servicing webtoons to users generate and use representative images of webtoons to introduce the webtoons to the users. For example, webtoons may be displayed to users through websites or mobile pages, based on various conditions, for example, a published date, a completion status, rankings, order of titles, and the like. Here, each of the webtoons may be displayed with information used for the users to identify a corresponding webtoon such as a representative image of the webtoon and a title of the webtoon, and/or information used to draw interest of the users on the corresponding webtoon. Here, the representative image may include an image that represents a single whole webtoon having a series of episodes and an image that represents each episode of the corresponding webtoon.

A service provider that provides webtoons to users needs to generate a representative image for each of the webtoons provided through a service. Here, as a number of webtoons to be serviced increases, cost used to generate a representative image also increases. For example, if new episodes of tens of webtoons are registered and serviced a day, a large amount of time and efforts are required for the service provider to verify all of the contents of the respective episodes of each of tens of webtoons and to generate representative images suitable for the respective episodes. Also, since information about the plurality of webtoons or the plurality of episodes is displayed on a single screen, a size of a representative image is limited, which makes it difficult to use a cut image of a webtoon as a representative image. That is, to generate a representative image, additional cost is required to select a single image from among a large number of images and to select and extract a main portion from the selected image, instead of simply selecting a single image from among the plurality of images.

Also, users expect a representative image for each of various features of the webtoons. However, to meet such expectation, a larger amount of resources are required. For example, webtoons may be displayed for users in a form of a list in which the webtoons are classified based on various conditions, for example, rankings, genres, and the like. However, as described above, a large amount of resources are required to simply generate a representative image for each webtoon and for each episode of each webtoon. Therefore, it is difficult to generate and use various types of representative images based on various ratios and/or sizes by considering features of each list and/or each user interface.

Also, there is a need to select a representative image of specific content, such as an illustration, a photo album of a user, and a plurality of images provided for a specific product in addition to the aforementioned webtoon.

BRIEF SUMMARY OF THE INVENTION

One or more example embodiments provide a representative image generation method that may recognize an object in content, such as a webtoon, an illustration, a plurality of images related to a specific product, a photo album of a user, and the like, and may automatically generate a representative image for the corresponding content, a computer apparatus for performing the representative image generation method, a computer program stored in a non-transitory computer-readable record medium to perform the representative image generation method on a computer in conjunction with the computer, and the non-transitory computer-readable record medium.

One or more example embodiments provide a representative image generation method that may provide a tool capable of automatically generating and managing a representative image using an image matching model, a computer apparatus for performing the representative image generation method, a computer program stored in a non-transitory computer-readable record medium to perform the representative image generation method on a computer in conjunction with the computer, and the non-transitory computer-readable record medium.

According to an aspect of at least one example embodiment, there is provided a representative image generation method including recognizing an object in at least one image included in content; generating a recognition result image by extracting an area including the recognized object from the at least one image; and generating a representative image related to the content based on the generated recognition result image.

According to an aspect of at least one example embodiment, there is provided a computer program stored in a non-transitory computer-readable record medium to perform the representative image generation method on a computer in conjunction with the computer.

According to an aspect of at least one example embodiment, there is provided a non-transitory computer-readable record medium storing a program to perform the representative image generation method on a computer.

According to an aspect of at least one example embodiment, there is provided a computer apparatus including at least one processor configured to execute a computer-readable instruction. The at least one processor is configured to recognize an object in at least one image included in content, generate a recognition result image by extracting an area including the recognized object from the at least one image, and generate a representative image related to the content based on the generated recognition result image.

According to some example embodiments, it is possible to recognize an object in content, such as a webtoon, an illustration, a plurality of images related to a specific product, a photo album of a user, and the like, and to automatically generate a representative image for the corresponding content.

According to some example embodiments, it is possible to provide a tool capable of automatically generating and managing a representative image using an image matching model.

DETAILED DESCRIPTION OF THE INVENTION

Hereinafter, example embodiments will be described with reference to the accompanying drawings.

A representative image generation method according to example embodiments may be performed through a computer apparatus or a server that is described below. Here, a computer program according to example embodiments may be installed and executed on the computer apparatus, and the computer apparatus may perform the representative image generation method according to the example embodiments under control of the executed computer program. The computer program may be stored in a non-transitory computer-readable record medium to perform the representative image generation method on a computer in conjunction with the computer apparatus.

Figure 1:
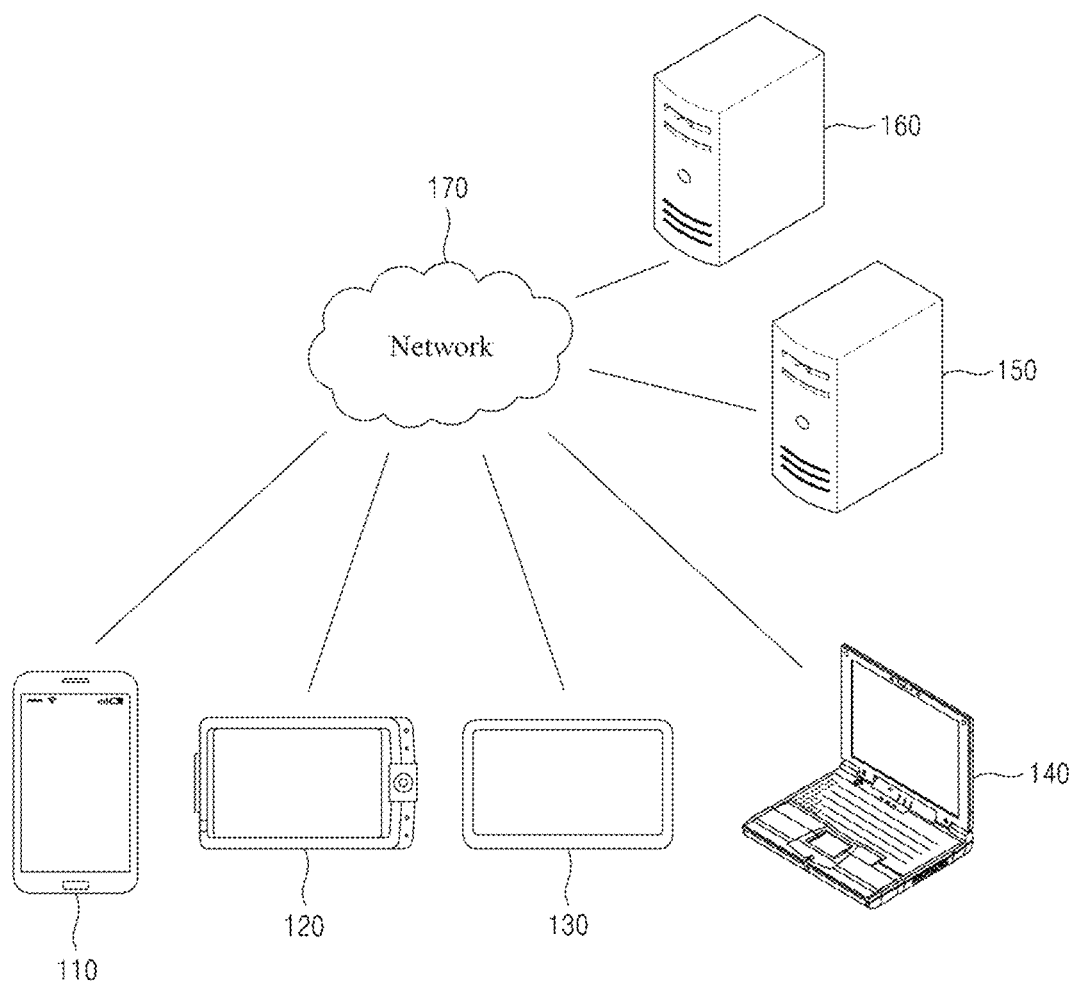
FIG. 1 is a diagram illustrating an example of a network environment according to an example embodiment.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices or a number of servers are not limited thereto.

Each of the plurality of electronic devices 110, 120, 130, and 140 may be a fixed terminal or a mobile terminal configured as a computer apparatus. For example, the plurality of electronic devices 110, 120, 130, and 140 may be a smartphone, a mobile phone, a navigation, a computer, a laptop computer, a digital broadcasting terminal, a personal digital assistant (PDA), a portable multimedia player (PMP), and a tablet personal computer (PC). For example, although FIG. 1 illustrates a shape of a smartphone as an example of the electronic device (1) 110, the electronic device (1) 110 may indicate one of various physical computer apparatuses capable of communicating with other electronic devices 120, 130, and 140, and/or the servers 150 and 160 over the network 170 in a wireless communication manner or in a wired communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), and the Internet. Also, the network 170 may include at least one of network topologies that include a bus network, a star network, a ring network, a mesh network, a star-bus network, a tree or hierarchical network, and the like. However, it is provided as an example only and the example embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and 140 over the network 170. For example, the server 150 may be a system that provides a first service associated with the plurality of electronic devices 110, 120, 130, and 140 connected over the network 170. The server 160 may be a system that provides a second service associated with the plurality of electronic devices 110, 120, 130, and 140 connected over the network 170. In detail, for example, the server 150 may provide a webtoon service as the first service. In this case, the server 150 may generate and use a representative image of each of webtoons to be displayed through a webtoon service using the representative image generation method according to example embodiments.

Figure 2:
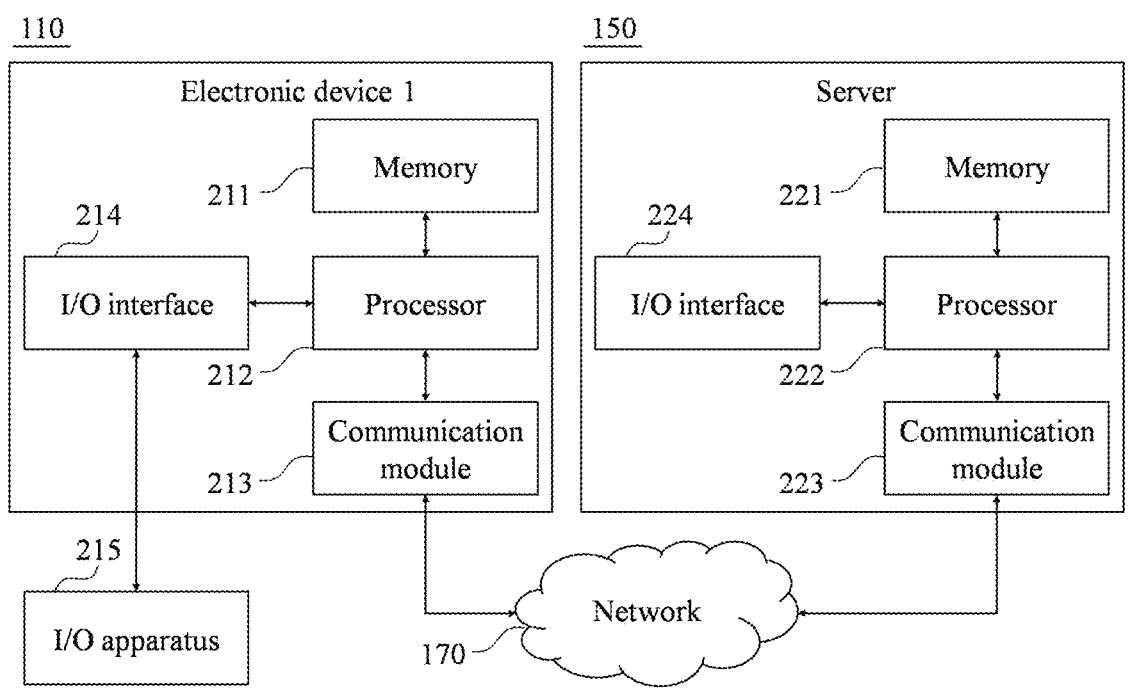
FIG. 2 is a block diagram illustrating a configuration of an electronic device and a server according to an example embodiment.

FIG. 2 is a block diagram illustrating an example of an electronic device and a server according to at least one example embodiment. FIG. 2 illustrates a configuration of the electronic device (1) 110 as an example for a single electronic device and illustrates a configuration of the server 150 as an example for a single server. The same or similar components may be applicable to other electronic devices 120, 130, and 140, or the server 160.

Referring to FIG. 2, the electronic device (1) 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), and a disk drive, as a non-transitory computer-readable record medium. The permanent mass storage device such as ROM and disk drive may be included in the electronic device (1) 110 or the server 150 as a permanent storage device separate from the memory 211, 221. Also, an OS or at least one program code, for example, a code for a browser installed and executed on the electronic device (1) 110 or an application installed and executed on the electronic device (1) 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device (1) 110 and the server 150 over the network 170 and may provide a function for communication with another electronic device, for example, the electronic device (2) 120 or another server, for example, the server 160. For example, the processor 212 of the electronic device (1) 110 may transfer a request created based on a program code stored in the storage device, such as the memory 211, to the server 150 over the network 170 under control of the communication module 213. Inversely, a control signal, an instruction, content, a file, etc., provided under control of the processor 222 of the server 150 may be received at the electronic device (1) 110 through the communication module 213 of the electronic device (1) 110 by going through the communication module 223 and the network 170. For example, a control signal, an instruction, content, a file, etc., of the server 150 received through the communication module 213 may be transferred to the processor 212 or the memory 211, and content, a file, etc., may be stored in a record medium, for example, the permanent storage device, further includable in the electronic device (1) 110.

The I/O interface 214 may be a device used for interface with an I/O apparatus 215. For example, an input device of the I/O apparatus 215 may include a device, such as a keyboard and a mouse, and an output device of the I/O apparatus 215 may include a device, such as a display and a speaker. As another example, the I/O interface 214 may be a device for interface with an apparatus in which an input function and an output function are integrated into a single function, such as a touchscreen. The I/O apparatus 215 may be configured as a single device with the electronic device (1) 110. Also, the I/O interface 224 of the server 150 may be a device for interface with an apparatus (not shown) for input or output that may be connected to the server 150 or included in the server 150. In detail, when processing instructions of the computer program loaded to the memory 211, the processor 212 of the electronic device (1) 110 may display a service screen configured using data provided from the server 150 or the electronic device (2) 120, or may display content on a display through the I/O interface 214.

According to other example embodiments, the electronic device (1) 110 and the server 150 may include a greater number of components than a number of components shown in FIG. 2. However, there is no need to clearly illustrate many components according to the related art. For example, the electronic device (1) 110 may include at least a portion of the I/O apparatus 215, or may further include other components, for example, a transceiver, a global positioning system (GPS) module, a camera, a variety of sensors, a database (DB), and the like. In detail, if the electronic device (1) 110 is a smartphone, the electronic device (1) 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Figure 3:
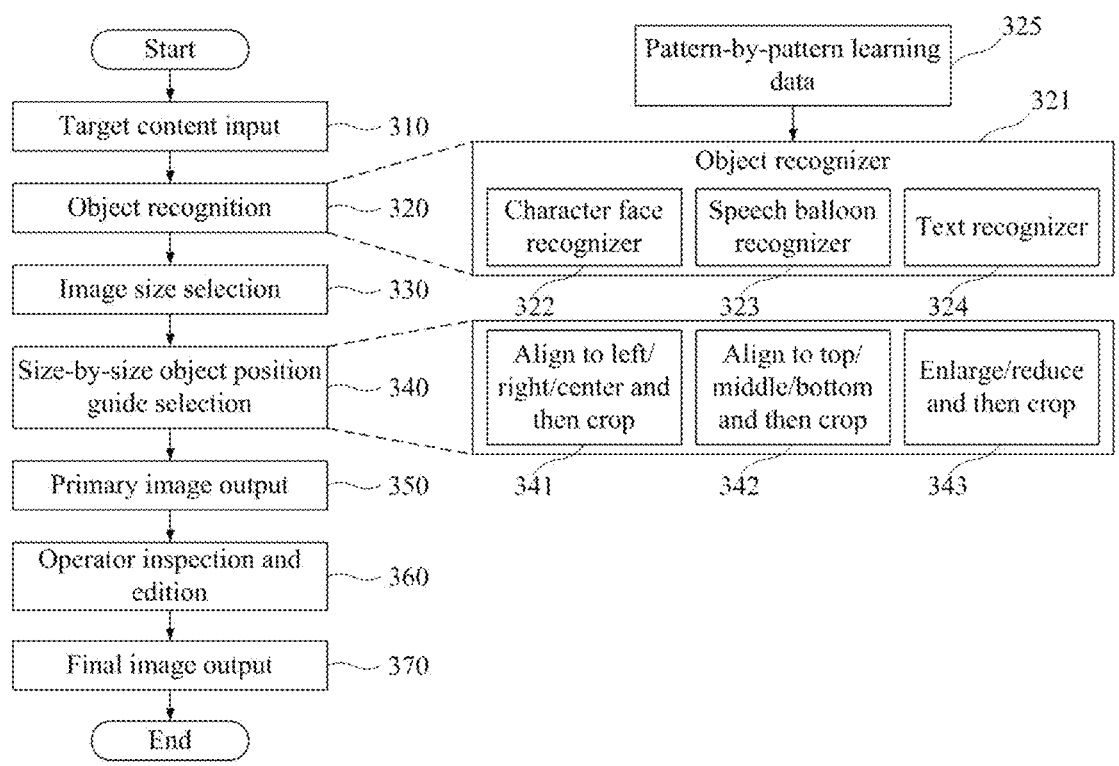
FIG. 3 illustrates an example of a representative image generation process according to an example embodiment.

FIG. 3 illustrates an example of a representative image generation process according to an example embodiment. An example of generating a representative image for a single webtoon as content is described with reference to FIG. 3. In FIG. 3, processes 310 to 370 may be performed by the server 150. And, an object recognizer 321, a character face recognizer 322, a speech balloon recognizer 323, and a text recognizer 324 may be functional expressions of the processor 222 of the server 150.

A target content input process 310 may be an example of a process of receiving one or more target images included in a webtoon. For example, the target content input process 310 may be a process of loading the one or more target images to the memory 221 of the server 150. The target images may be stored in a local storage of the server 150 in advance, or may be received from an external device. Here, a subsequent object recognition process 320 may be performed with respect to each of the received target images. For example, in the webtoon, a single episode may be configured as a single target image and may be configured as a plurality of target images classified for each cut. In this case, the object recognition process 320 may be performed with respect to each of the target images.

The object recognition process 320 may be an example of a process of recognizing an object in the received target image. The object recognition process 320 may be performed by an object recognizer 321. The object recognizer 321 may include, for example, a character face recognizer 322, a speech balloon recognizer 323, and a text recognizer 324.

The character face recognizer 322 may recognize a face of a character as an object in a target image, the speech balloon recognizer 323 may recognize a speech balloon as an object in the target image, and the text recognizer 324 may recognize a text as an object in the target image. Although examples of recognizing a character face, a speech balloon, and a text are described as a pattern of an object to be recognized, it is provided as an example only. The pattern of the object may variously use a shape of a person or a shape of an animal and/or a shape of a vehicle, such as a car or an airplane.

Pattern-by-pattern learning data 325 may be used to recognize each of patterns. The pattern-by-pattern learning data 325 may be used to train the object recognizer 321 and/or may be used as reference data of an object that is desired to be extracted in an image. For example, the pattern-by-pattern learning data 325 may be generated using an existing content and target images extracted by a person from the existing content.

As an example of learning, images including faces of various characters may be input as learning data to the character face recognizer 322, images including various speech balloons may be input to the speech balloon recognizer 323, and texts may be input to the text recognizer 324 as learning data. Here, each of the character face recognizer 322, the speech balloon recognizer 323, and the text recognizer 324 may learn a function for recognizing each required pattern through machine learning using the input learning data. A method of training recognizers through machine learning and using the trained recognizers may be easily understood by those skilled in the art through known arts in association with machine learning.

As an example of reference data, an image including a character face that is a standard of an object to be recognized may be input as reference data to the character face recognizer 322. In this case, the character face recognizer 322 may recognize a character face in a target image based on the character face of the image input as learning data. Similar thereto, an image including a speech balloon that is a standard of an object desired to be recognized may be input as reference data to the speech balloon recognizer 323 and a text that is a standard of an object to be recognized may be input as reference data to the text recognizer 324. In detail, if a text "car" is input as reference data, the text recognizer 324 may search a target image to determine whether the text "car" is included.

As described above, the object recognition process 320 may be performed with respect to each of the target images input through the target content input process 310. Here, if a plurality of target images is present, a target image in which an object is recognized may be present and a target image in which an object is not recognized may be present. Also, a plurality of objects may be recognized in a single target image. Here, the object recognizer 321 may extract an area including an object recognized in a target image and may generate a recognition result image for each recognized object. For example, the character face recognizer 322 may extract an area including a character face recognized in a target image and may generate a recognition result image with a size preset for the extracted area.

An image size selection process 330 may be an example of a process of determining a size, for example, 120×120 pixels or 96×96 pixels, of a representative image to be extracted in the recognition result image.

A size-by-size object position guide selection process 340 may be an example of a process of determining a position of an object in a representative image. For example, FIG. 3 illustrates an example 341 for aligning and then cropping a position of an object in a representative image to one of the left, right, and center of the representative image, an example 342 for aligning and then cropping the position of the object to one of the top, middle, and bottom, and an example 343 for enlarging or reducing and then cropping the position of the object. Depending on example embodiments, the position of the object may be determined based on further various guides to be aligned to upper left, lower right, or middle left and then enlarged, or to be aligned to upper right and then reduced.

A primary image output process 350 may be an example of a process of outputting the representative image extracted in the recognition result image, and an operator inspection and edition process 360 may be an example of a process of inspecting, by an operator, and/or editing the output representative image. Also, a final image output process 370 may be an example of a process of outputting the representative image inspected and/or edited by the operator. A final image may be displayed through a site for providing a webtoon to users. Here, the primary image output process 350 and the operator inspection and edition process 360 may be omitted depending on example embodiments. In this case, the primary image output process 350 may be a process of displaying the representative image extracted from the recognition result image through the site for providing the webtoon to users, which is similar to the final image output process 370. For example, a predetermined period may be required to train the server 150 to automatically process the object recognition process 320, the image size selection process, 330, and the size-by-size object position guide selection process 340. That is, a learning period may be required such that the server 150 may automatically generate a representative image suitable for input target content. Before the learning period is completed, the operator needs to directly inspect and/or edit the generated representative image. Also, data collected according to inspection and/or edition of the operator may be used as learning data for the server 150 to generate the representative image during the learning period.

Figure 4:
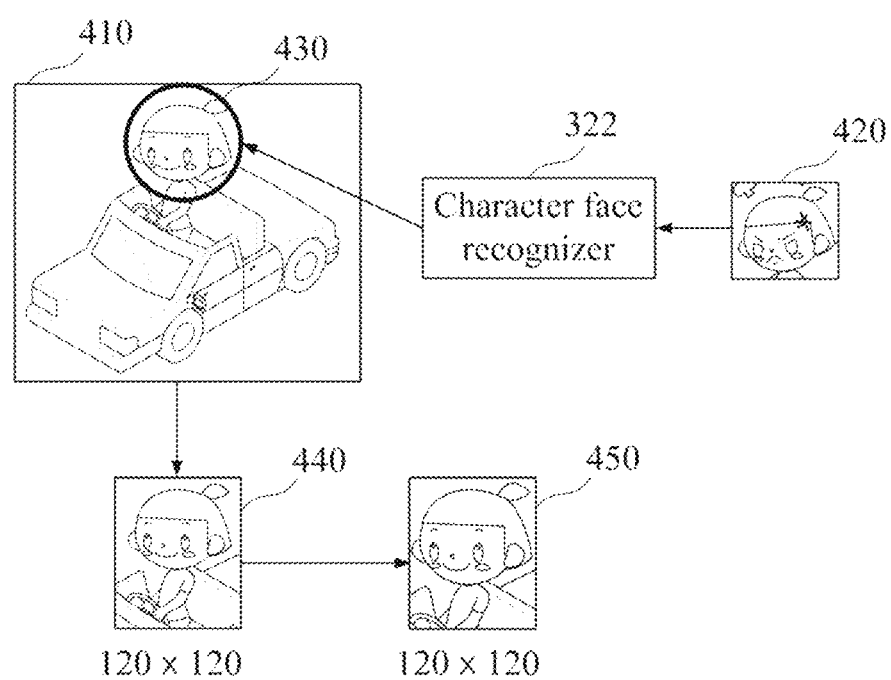
FIG. 4 illustrates an example of a process of outputting a final image in a target image according to an example embodiment.

FIG. 4 illustrates an example of a process of outputting a final image in a target image according to an example embodiment. FIG. 4 illustrates an example of a target image 410 input through the target content input process 310 of FIG. 3 and also illustrates an example of recognizing, by the character face recognizer 322, an object in the target image 410 using an image 420 input as reference data in the object recognition process 320. Here, a circle 430 indicated with a solid line in the target image 410 of FIG. 4 represents an example of the object recognized in the target image 410.

Also, FIG. 4 illustrates an example of a primary image 440 extracted through the image size selection process 330 and the size-by-size object position guide selection process 340. Here, the primary image 440 has a size of "120×120 pixels" and the object is positioned at an upper center of the primary image 440.

Also, FIG. 4 illustrates an example in which a final image 450 is generated in such a manner that the primary image 440 is edited by the operator. Here, the final image 450 is generated by enlarging, by the operator, an object portion in the primary image 440. The generated final image 450 may be used as a representative image for target content. For example, when the final image 450 is output with respect to a specific episode of a webtoon, the final image 450 may be displayed at a site for servicing the webtoon as a representative image for the specific episode of the corresponding webtoon. If inspection and/or edition by the operator is unnecessary, the primary image 440 may be displayed at a site for servicing the webtoon as a representative image without generating the final image 450.

FIGS. 5 to 8 illustrate examples of a tool for generating and managing a representative image according to an example embodiment. FIGS. 5 to 8 illustrate screen examples of a tool for generating and managing a representative image (hereinafter, an image generation and management tool 500). The image generation and management tool 500 may be produced in the form of a website and provided for an operator by the server 150.

Figure 5:
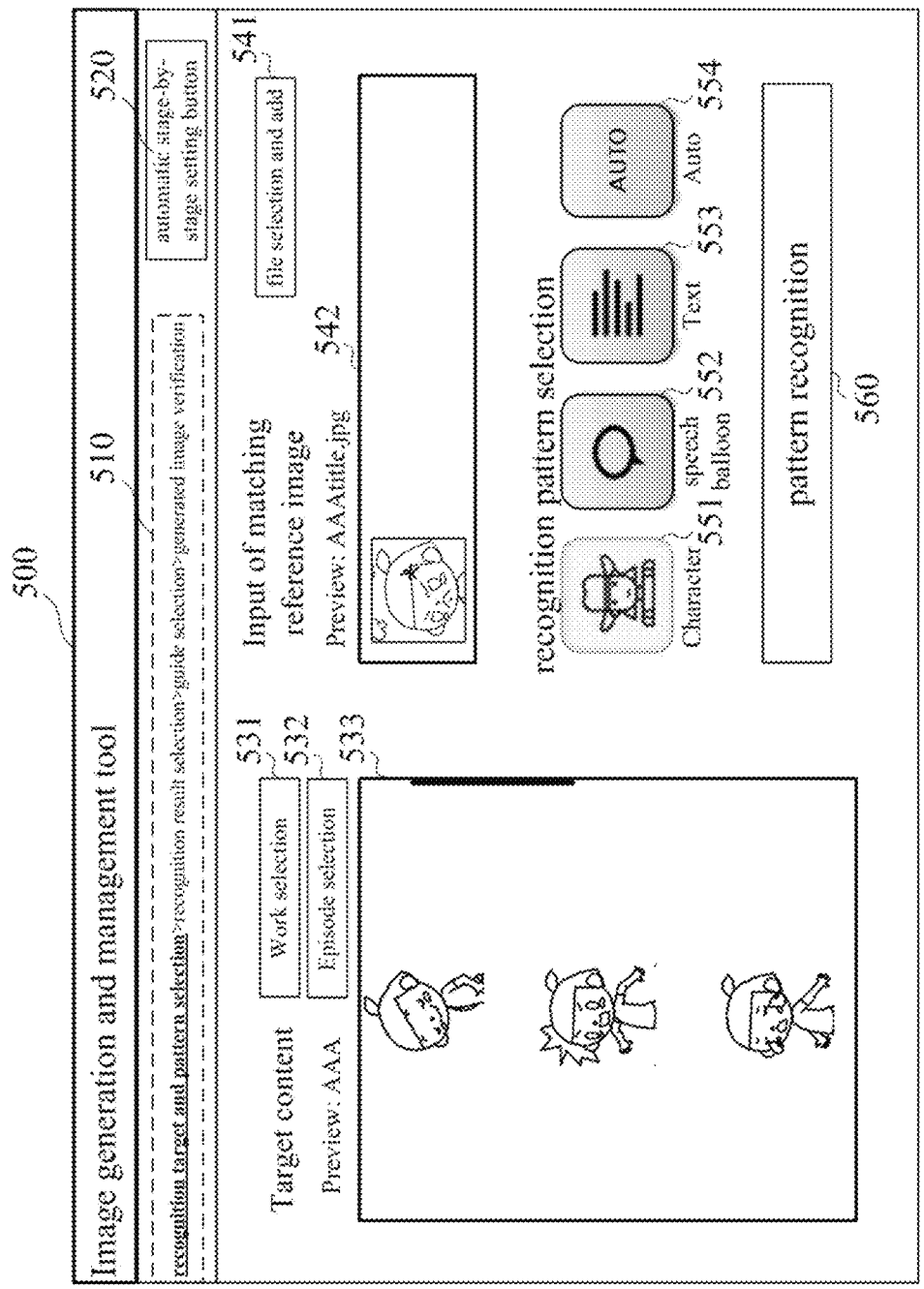
FIGS. 5 to 8 illustrate examples of a tool for generating and managing a representative image according to an example embodiment.

A first box 510 indicated with dotted lines represents stages for generating a representative image. Here, FIG. 5 illustrates a "recognition target and pattern selection" stage. Here, an automatic stage-by-stage setting button 520 may be a user interface to which a link to a function for setting a stage for automatically processing the stages included in the first box 510 is set. For example, in response to the operator pressing the automatic stage-by-stage setting button 520, a user interface for setting automatic processing to each of the four stages, "recognition target and pattern selection," "recognition result selection," "guide selection," and "generated image verification," included in the first box 510 may be provided to the operator. With respect to the automatic processing set stages, the server 150 may automatically perform corresponding processing according to a corresponding stage based on learning.

The image generation and management tool 500 may include a work selection button 531 for selecting a single webtoon from among a plurality of webtoons or all of the webtoons, an episode selection button 532 for selecting an episode of the selected webtoon, and a first preview window 533 for previewing the selected work or episode. Also, the image generation and management tool 500 may further include a file selection and add button 541 for receiving an input of a matching reference image and a second preview window 542 for previewing an image of a selected file. Here, the matching reference image may be an example of the reference data.

Also, the image generation and management tool 500 may include buttons 551, 552, 553, and 554 for selecting a recognition pattern. The character button 551 may be a user interface for selecting the character face recognizer 322 of FIG. 3, and the speech balloon button 552 may be a user interface for selecting the speech balloon recognizer 323 of FIG. 3. Also, the text button 553 may be a user interface for selecting the text recognizer 324 of FIG. 3, and the automation button 554 may be a user interface for setting the server 150 to automatically select a pattern based on learning. In FIG. 5, the character button 551 is selected as an example.

Also, the image generation and management tool 500 may include a pattern recognition tool 560 for processing recognition of an object. In the example embodiment of FIG. 5, in response to a selection of the operator on the pattern recognition tool 560, processing for recognizing a character face in a target image of a selected webtoon "AAA" is performed. Here, the server 150 may recognize the character face in the target image by using matching reference image "AAAtitle.jpg" as reference data.

If automatic processing is set for the "recognition target and pattern selection" stage, the server 150 may select a work and/or episode, a pattern, and reference data based on learning and may automatically process recognition of the object.

Figure 6:
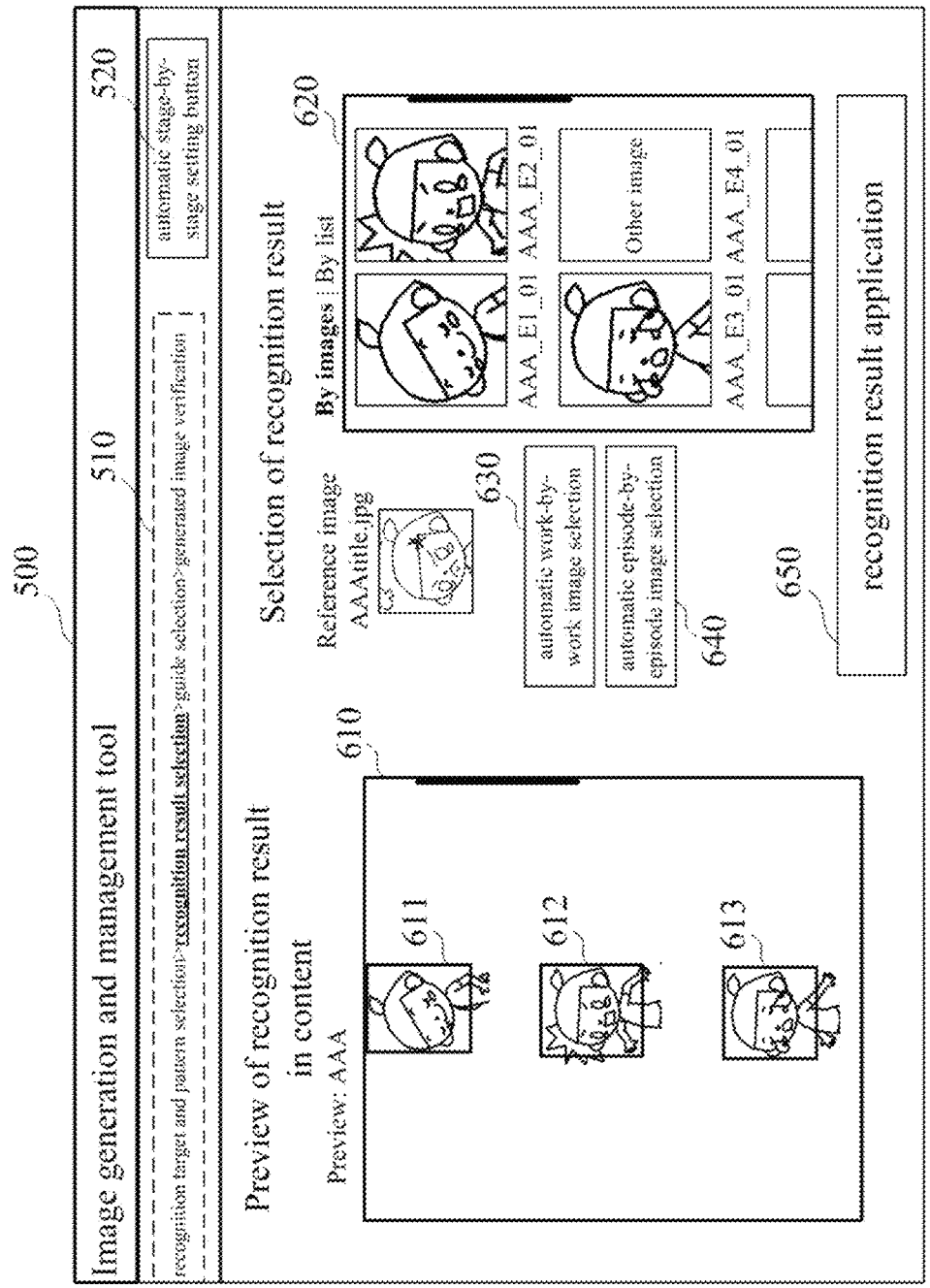

FIG. 6 illustrates a display example of the image generation and management tool 500 for the "recognition result selection" stage. Here, a preview of a work or an episode that includes recognized objects as shown in boxes 611, 612, and 613 indicated with solid lines may be displayed on a third preview window 610. Also, previews of the recognized objects may be displayed on a fourth preview window 620. Here, the operator may directly set at least one of the objects displayed on the fourth preview window 620. Alternatively, the operator may automatically set an object for each work through an automatic work-by-work image selection button 630 or may automatically set an object for each episode through an automatic episode-by-episode image selection button 640. For example, in response to a selection on a webtoon "AAA" as target content, objects may be recognized from the webtoon "AAA." Here, in response to a selection on the automatic episode-by-episode image selection button 640, objects for each of episodes included in the webtoon "AAA" may be selected from among the recognized objects. For example, with the assumption that selected objects "AAA_E1_01," "AAA_E2_01," and "AAA_E3_01" are present for the respective episodes in the webtoon "AAA," the server 150 may automatically select the object "AAA_E1_01" for the episode "AAA_E1," the object "AAA_E2_01" for the episode "AAA_E2," and the object "AAA_E3_01" for the episode "AAA_E3," respectively. A recognition result application button 650 may be a user interface for applying a selected object to a work or an episode. Here, applying an object may indicate associating the work or the episode with an image of the selected object.

If automatic processing is set for the "recognition result selection" stage, the server 150 may automatically select and apply an image of an object for a work and/or episode based on learning.

Figure 7:
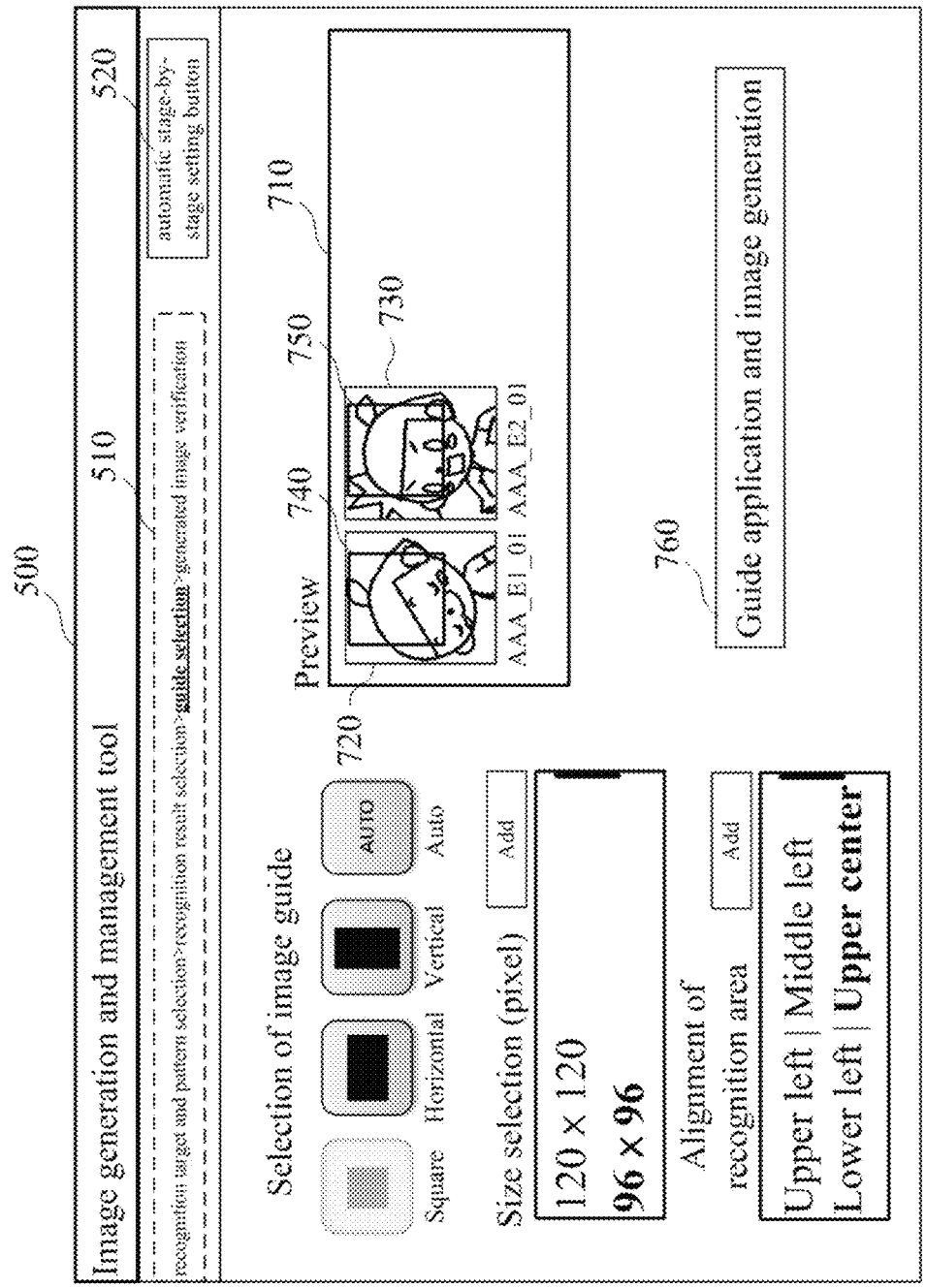

FIG. 7 illustrates a display example of the image generation and management tool 500 for the "guide selection" stage. Here, previews of images 720 and 730 selected and applied in the "recognition result selection" stage of FIG. 6 are displayed on a fifth preview window 710. The operator may extract a desired image using a guide for the images 720 and 730 of the object. FIG. 7 illustrates an example in which square guides 740 and 750 each with a size of 96×96 pixels are provided to upper centers of the images 720 and 730 of the object, respectively. The operator may select a shape (square, horizontal, vertical, etc.) of a guide, a size of a guide, and a position at which a guide recognition area is to be aligned through the "guide selection" stage and may extract a desired primary image from the images 720 and 730 of the object. For example, if the operator presses a guide application and image generation button 760 by selecting a guide, the selected guide may be applied, and a primary image may be extracted and generated based on the applied guide.

Also, if automatic processing is set for the "guide selection" stage, the server 150 may generate a primary image by selecting a shape, a size, and a position of a guide based on learning.

Figure 8:
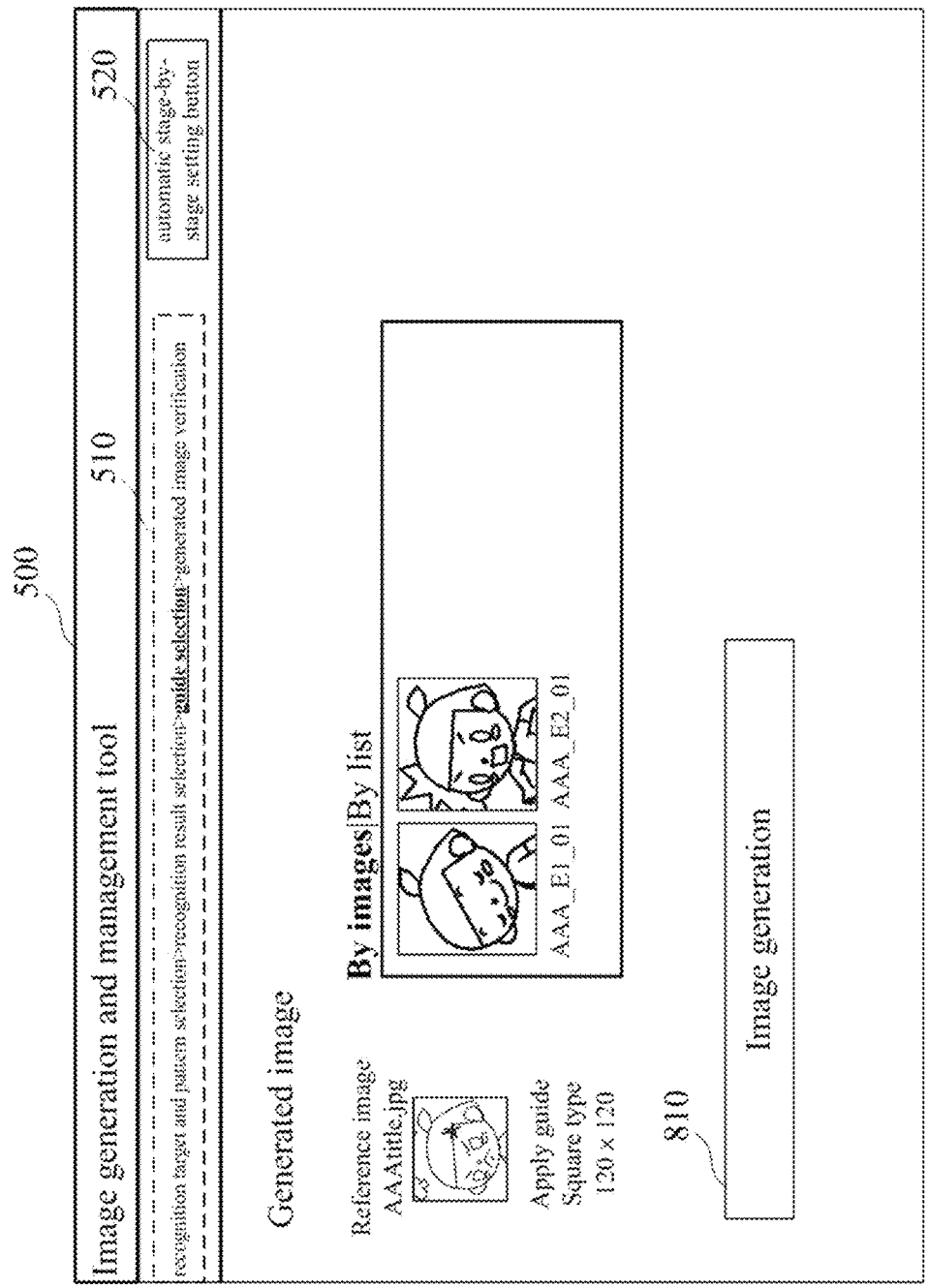

FIG. 8 illustrates a display example of the image generation and management tool 500 for the "generated image verification" stage. In the "generated image verification" stage, primary images generated in FIG. 7 may be displayed. FIG. 8 illustrates an example of a reference image and selected primary images through a square guide with a size of 120×120 pixels. If the operator presses an image generation button 810 after inspection and/or edition, a final image (a representative image) may be generated.

Although the image generation and management tool 500 provided to the operator is described above with reference to FIGS. 5 to 8, it is provided as an example for understanding by explaining a progress process of each of the stages. At least one of the "recognition target and pattern selection" stage, the "recognition result selection" state, and the "guide selection" stage may be automatically performed by the server 150 trained through machine learning.

For example, the server 150 may generate a representative image using an image of an object that is selected from among images of the recognized objects based on a degree of matching with reference data. Also, the server 150 may generate the representative image by further using reactions of users, for example, a user stay time which is the time users display each images on the screen of a user terminal, a click through rate of a corresponding image, a user comment or recommendation, and the like. For example, the server 150 may measure and manage a display time corresponding to the user stay time for each scene displayed on a terminal screen of each of the users in a webtoon in a format of a vertical image file posted to a website. The longer the user stay time measured for a plurality of users, a corresponding scene may be determined to have a relatively high popularity and a probability that an image of an object extracted in the scene may be selected may increase. Also, a function for posting a recommendation or a comment based on a cut unit may be provided in a webtoon in a form of switching between scenes of a cut unit. In this case, a popular cut may be set based on a number of recommendations, a number of comments, etc., for each cut, and an image of an object extracted from the corresponding cut may be highly likely to be selected. As another example, a scene clicked on by a relatively large number of users may be determined as a popular scene. The server 150 may calculate a popularity for each scene or for each cut by quantifying each of reactions of the users, and, in the case of selecting an image of an object based on the calculated popularity, may assign a weight to an image of an object extracted from a popular scene or a popular cut.

Although a method of generating a representative image for a webtoon is described with the example embodiments, it is provided as an example only. Those skilled in the art may easily understand that a representative image may be extracted from any type of contents including at least one image through the aforementioned representative image generation method. Types of content may include, for example, an illustration, a plurality of images related to a specific product, and a photo album of a user.

Figure 9:
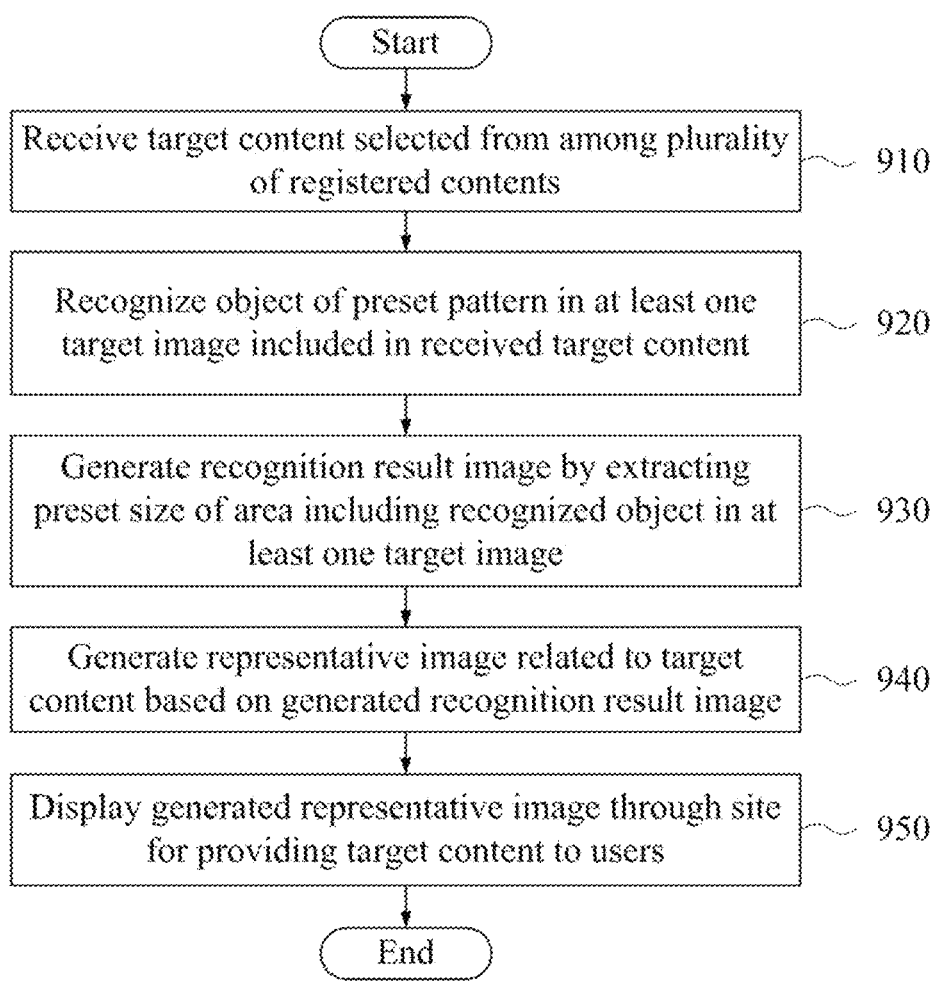
FIG. 9 is a flowchart illustrating an example of a representative image generation method according to an example embodiment.

FIG. 9 is a flowchart illustrating an example of a representative image generation method according to an example embodiment. The representative image generation method may be performed by a computer apparatus, such as the server 150. Here, the processor 222 of the server 150 may be configured to execute a control instruction according to a code of at least one program or a code of an OS included in the memory 221. Here, the processor 222 may control the server 150 to perform operations 910 to 950 included in the representative image generation method of FIG. 9 in response to the control instruction provided from the code stored in the server 150.

Referring to FIG. 9, in operation 910, the server 150 may receive target content selected from among a plurality of registered contents. For example, the plurality of registered contents may include a plurality of registered webtoons, the target content may include a single webtoon or a single episode included in the single webtoon, and the generated representative image may include a representative image of the single webtoon or a representative image of the single episode. As described above, content is not limited to the webtoon and any type of contents including a plurality of images or a single image in which a plurality of scenes is connected may employ the representative image generation method to generate a representative image of content.

In operation 920, the server 150 may recognize an object of a preset pattern in at least one target image included in the received target content. As described above, the preset pattern may include at least one of a face pattern of a character, a speech pattern, and a text pattern. Also, depending on example embodiments, the preset pattern may be variously set and/or learned, if necessary, such as a shape of a person, a shape of an animal, and/or a shape of a vehicle such as a car and an airplane.

The text pattern may refer to a text that represents a specific line or a specific keyword and the text may be recognized as an object. Such text recognition may be used for a subsequent text search or image search from the content. For example, for text recognition, all of the texts included in target images included in target content may be recognized for comparison to a specific line or a specific keyword. Here, recognized texts may be stored in association with a corresponding target image, and stored data may be used for the text search or the image search from the content. In detail, an example in which a text "ratio is different" is recognized in association with a scene A of a webtoon and stored in association with the scene A may be considered. In this case, the text "ratio is different" may be retrieved and provided from content through a text search using a keyword "ratio," or an image for the scene A may be retrieved and provided. Alternatively, texts and target images stored in association with each other may be used to provide an image similar to an image input as a query. For example, in response to an input of an image related to a ratio or an image including the text "ratio" as a query, the scene A may be provided as a similar image. Also, a recognized text may be used to generate a subtext for persons who are visually handicapped. For example, a subtext for explaining the scene A to persons who are visually handicapped may be generated using a text recognized from the scene A.

Also, the server 150 may use reference data to recognize an object. For example, in operation 920, the server 150 may receive reference data for each preset pattern and may recognize an object in at least one target image based on a degree of matching with the reference data. If a plurality of objects is recognized, an object having a highest degree of matching with the reference data may be selected and used.

In operation 930, the server 150 may generate a recognition result image by extracting a preset size of an area including the recognized object in the at least one target image. Here, the area with the preset size may be in various shapes, for example, a polygonal shape, a circular shape, and an oval shape.

When a plurality of recognition result images is generated from at least one target image, the server 150 may select at least one recognition result image from among the plurality of recognition result images based on a user reaction to a scene or a cut of the target content. Here, the user reaction may include at least one of a user stay time, a click through rate, a number of recommendations, and a number of comments with respect to the scene or the cut of the target content.

The user stay time may be acquired by measuring an amount of time in which a corresponding scene or cut is displayed on a terminal of the user. Also, the click through rate may be acquired by measuring a number of times the corresponding scene or cut is selected on the terminal of the user.

In operation 940, the server 150 may generate a representative image related to the target content based on the generated recognition result image. For example, in operation 940, the server 150 may determine a shape, a size, and an alignment position of a guide, may apply the guide with the determined shape and size to the generated recognition result image based on the alignment position, may extract a recognition area that is recognized based on the applied guide, and may generate an image including the extracted recognition area as a representative image. The example of using the guide is described above with reference to FIG. 7.

In operation 950, the server 150 may display the generated representative image through a site for providing the target content to users. Although an example embodiment of generating and displaying a representative image for a single piece of target content is described with reference to FIG. 9, it may be easily understood that a representative image may be automatically generated and displayed with respect to each of a plurality of target contents (for example, episodes of each of a plurality of webtoons to be uploaded on the day) by applying the representative generation and display process to each of the plurality of target contents.

As described above, according to some example embodiments, it is possible to recognize an object in content, such as a webtoon, an illustration, a plurality of images related to a specific product, a photo album, and the like, and to automatically generate a representative image for the corresponding content. Also, it is possible to provide a tool capable of automatically generating and managing a representative image using an image matching model.

The systems or apparatuses described herein may be implemented using hardware components, software components, or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, virtual equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may transitorily store the same for execution or download. Also, the media may be various types of recording devices or storage devices in a form of one or a plurality of hardware components. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include record media and storage media managed by Appstore that distributes applications or a site that supplies and distributes other various types of software, a server, and the like. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A method performed by a processor of generating a representative image corresponding to a plurality of images in at least one target episode of webtoon content, the method comprising:
   receiving the plurality of images in the target episode of the webtoon content;
   receiving learning data based on images of at least one existing episode of the webtoon content, the learning data including a predefined reference image;
   machine learning a function for recognizing a target object in the plurality of images in the target episode based on a degree of matching with the reference image using the learning data,
   recognizing the target object in at least one image included in the webtoon content based on result of the machine learning of the function;
   generating a recognition result image by extracting an area including the recognized target object in the at least one image; and
   generating the representative image related to the webtoon content based on the generated recognition result image.

2. The method of claim 1, wherein the recognizing of the target object comprises recognizing an object corresponding to at least one pattern in the at least one image relating to the reference image, and
   the at least one pattern comprises at least one of a facial pattern of a character, a speech balloon pattern, and a text pattern.

3. The method of claim 1, wherein the reference image corresponds to at least one predefined pattern; and
   the at least one predefined pattern includes at least one of a facial pattern of a character, a speech balloon pattern, and a text pattern.

4. The method of claim 1, wherein the generating of the representative image comprises:
   determining a shape, a size, and an arrangement position of a guide;
   applying the guide with the determined shape and size to the generated recognition result image based on the arrangement position and extracting a recognition area that is recognized based on the applied guide; and generating an image including the extracted recognition area as the representative image.

5. The method of claim 1, further comprising:
in response to a plurality of recognition result images being generated from the at least one image, selecting at least one recognition result image from among the plurality of recognition result images based on a user reaction to a scene or a cut of the webtoon content.

6. The method of claim 5, wherein the user reaction comprises at least one of a user stay time, a click through rate, a number of recommendations, and a number of comments with respect to the scene or the cut.

7. The method of claim 1, further comprising:
regenerating the representative image based on a change in a user reaction to a scene or a cut of the webtoon content.

8. The method of claim 7, wherein the user reaction comprises at least one of a user stay time, a click through rate, a number of recommendations, and a number of comments with respect to the scene or the cut.

9. The method of claim 1, further comprising:
displaying the generated representative image through a site for providing the webtoon content to users.

10. A non-transitory computer-readable recording medium storing a program which, when executed by a computer, causes the computer to perform the method of generating a representative image as defined in claim 1.

11. A computer apparatus comprising:
at least one processor configured to execute a computer-readable instruction for generating a representative image corresponding to a plurality of images in at least one target episode of webtoon content, wherein the at least one processor is configured to
receive the plurality of images in the target episode of the webtoon content,
receive learning data based on images of at least one existing target episode of the webtoon content, the learning data including a predefined reference image,
perform machine learning of a function for recognizing a target object in the plurality of images in the target episode based on a degree of matching with the reference image using the learning data,
recognize the target object in at least one image included in the webtoon content based on a result of the machine learning of the function,
generate a recognition result image by extracting an area including the recognized target object in the at least one image, and
generate a representative image related to the webtoon content based on the generated recognition result image.

12. The computer apparatus of claim 11, wherein the recognizing of the target object comprises recognizing an object corresponding to at least one pattern in the at least one image relating to the reference image, and
the at least one pattern comprises at least one of a facial pattern of a character, a speech balloon pattern, and a text pattern.

13. The computer apparatus of claim 11, wherein the reference image corresponds to at least predefined one pattern, and
the at least one predefined pattern includes at least one of a facial pattern of a character, a speech balloon pattern, and a text pattern.

14. The computer apparatus of claim 11, wherein the generating of the representative image comprises:
determining a shape, a size, and an arrangement position of a guide,
applying the guide with the determined shape and size to the generated recognition result image based on the arrangement position and extract a recognition area that is recognized based on the applied guide, and
generating an image including the extracted recognition area as the representative image.

15. The computer apparatus of claim 11, wherein, in response to a plurality of recognition result images being generated from the at least one image, the at least one processor is configured to select at least one recognition result image from among the plurality of recognition result images based on a user reaction to a scene or a cut of the webtoon content.

16. The computer apparatus of claim 11, wherein the at least one processor is configured to regenerate the representative image based on a change in a user reaction to a scene or a cut of the webtoon content.

* * * * *